Figure 1:
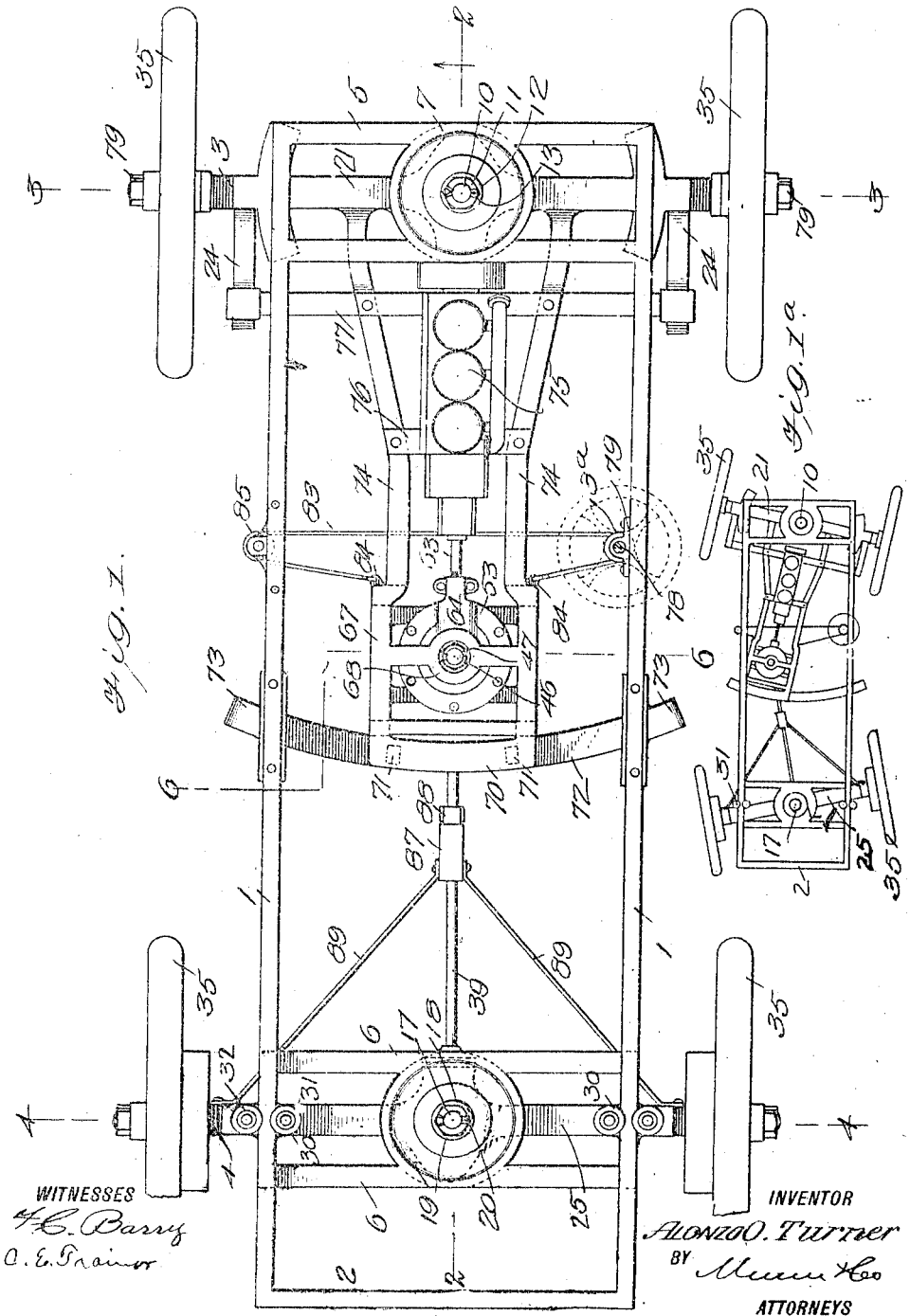

A. O. TURNER.
AUTO DRIVE.
APPLICATION FILED SEPT. 16, 1913.

1,113,071. Patented Oct. 6, 1914.
4 SHEETS—SHEET 2.

Fig. 2.

WITNESSES
F. C. Barry

INVENTOR
Alonzo O. Turner
BY Munn & Co.
ATTORNEYS

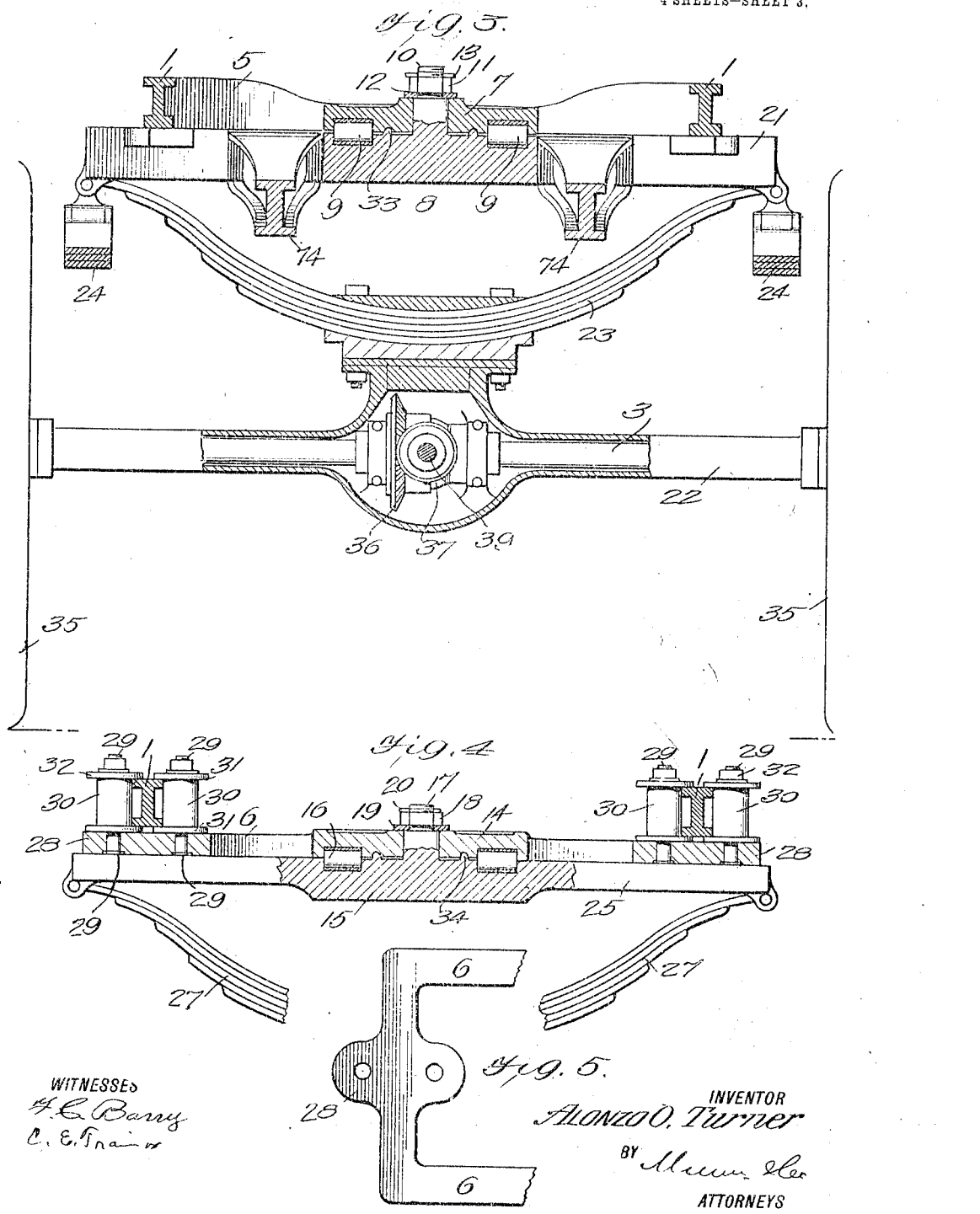

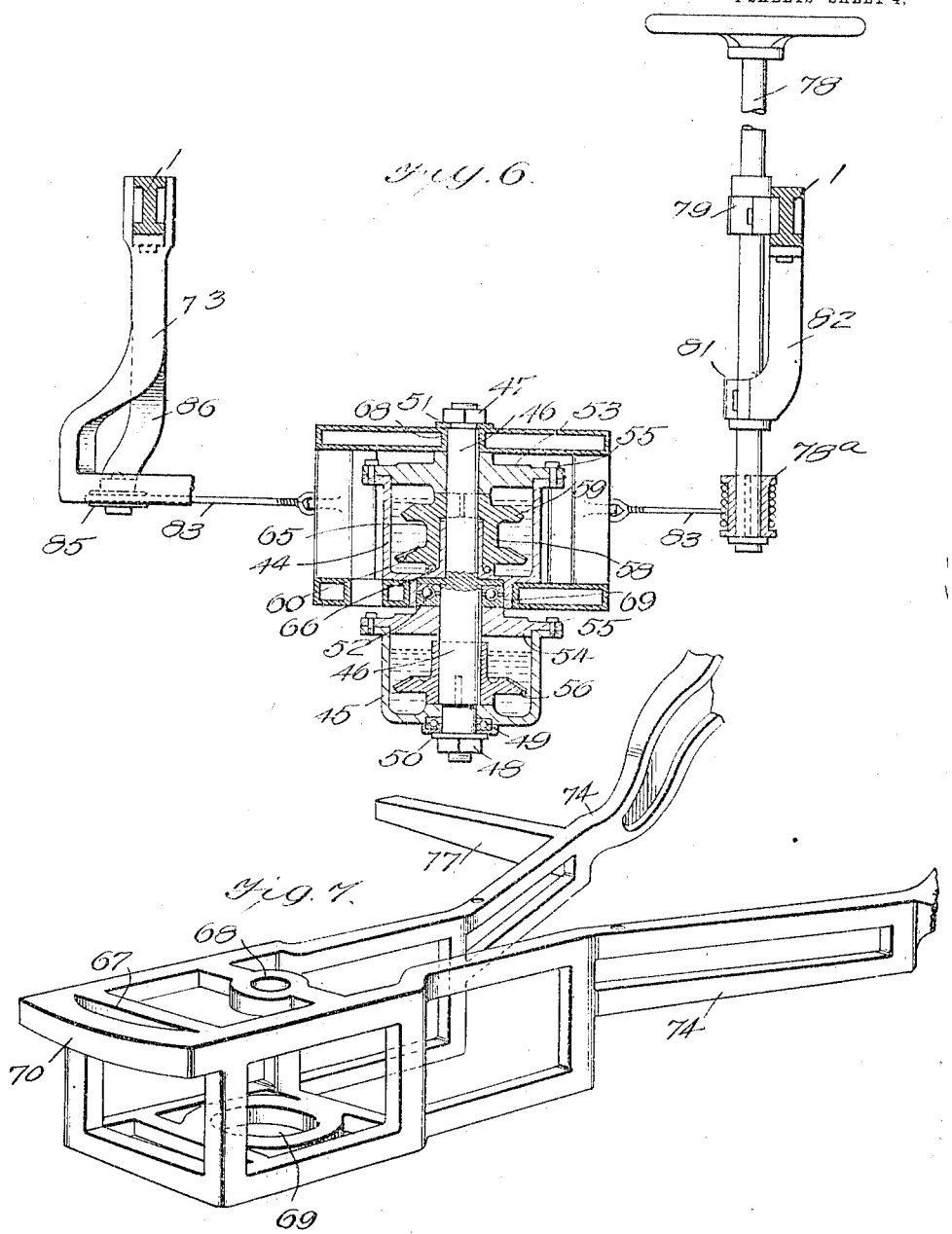

UNITED STATES PATENT OFFICE.

ALONZO OLLIF TURNER, OF TAMPA, FLORIDA.

AUTO-DRIVE.

1,113,071. Specification of Letters Patent. Patented Oct. 6, 1914.

Application filed September 16, 1913. Serial No. 789,980.

*To all whom it may concern:*

Be it known that I, ALONZO O. TURNER, a citizen of the United States, and a resident of Tampa, county of Hillsborough, and State of Florida, have made certain new and useful Improvements in Auto-Drives, of which the following is a specification.

My invention is an improvement in automobile drives, and has for its object to provide a drive of the character specified, especially adapted for heavy trucks and the like, and wherein a separate support is provided for the motor and the operating mechanism, the said support being connected to the front axle, and having steering mechanism connected therewith, to move the same whereby to guide the vehicle, and wherein the motor is connected with the four wheels, to directly drive the same.

In the drawings: Figure 1 is a top plan view of the frame of an automobile constructed in accordance with the invention, Fig. 1ª is a reduced view showing the position of the parts when turning, Figs. 2, 3, 4 and 6 are sections on the lines 2—2, 3—3, 4—4, and 6—6, respectively of Fig. 1, looking in the direction of the arrows, Fig. 5 is a detail top plan view of the roller support, and Fig. 7 is a perspective view of the support for the transmission.

The present embodiment of the invention comprises a substantially rectangular frame, consisting of longitudinal bars 1 and a connecting end bar 2 at the rear of the said bars 1, and the bars 1 are connected adjacent to the front axle 3 by a pair of laterally spaced parallel bars 5, and adjacent to the rear axle they are slidably connected to a pair of laterally spaced parallel bars 6.

At the center of each pair of bars 5 and 6, a fifth wheel is arranged. The fifth wheel at the front axle 3 consists of upper and lower sections 7 and 8, and a roller bearing 9 is arranged between the said sections. The lower section 8 of the fifth wheel is provided with an upwardly extending pivot or journal pin 10, which passes through a central opening in the upper section 7, and a nut 11 is threaded on a pin above the upper section. A washer 12 is arranged below the nut, and a cotter pin 13 is passed through the pin above the nut.

The rear fifth wheel consists of upper and lower sections 14 and 15, the upper section being integral with the bars, and the sections are separated by a roller bearing 16, and the lower section is provided with a pivot or journal pin 17 passing upwardly through the center of the upper section, and the pin is engaged by a nut 18 in the same manner as the pin 10. A washer 19 is arranged below the nut, and a cotter pin 20 is arranged above the nut.

The lower section 8 of the fifth wheel at the front of the truck is at the center of a bolster 21, and the bolster is connected to the housing 22 of the front axle by means of the usual springs 23. The lower section 15 of the rear fifth wheel is at the center of a rear bolster 25, and the said bolster is connected to the housing 26 of the rear axle by means of springs 27.

The bars 1 are slidably connected with what may be considered as the rear truck, and comprising the rear axle, the bolster 25, the bars 6, the rear fifth wheel, and integral end connections 28 between the said bars 6. A pair of journal pins in the form of vertically arranged bolts 29 is connected with the truck at each bar 1, the journal pins of each pair being arranged on opposite sides of the adjacent bar 1. A roller 30 is journaled on each journal pin, and each roller is provided at each of its ends with an annular flange or rib 31. The flanges or ribs 31 engage the upper and lower faces of the bars 1, the said bars being I-beams in the present instance.

Each roller is held in place by means of a nut 32 at the upper end of the bolt, and the said bolts are passed through the integral connections 28. It will be noticed from an inspection of Figs. 3 and 4 that the lower section of each fifth wheel is provided with oppositely arranged arc-shaped ribs 33, which engage corresponding grooves in the adjacent face of the adjacent upper section. Each of the axles 3 and 4 is solid or integral from end to end, and wheels 35 are secured to the ends of each of the said axles. A bevel gear wheel 36 is secured to each axle near the center thereof, in an enlargement of the adjacent housing, and each bevel gear is engaged by a bevel pinion 37 for driving the said axle.

The pinion 37 at the front axle is secured to the front end of a front driving shaft 38, and the pinion 37 at the rear axle is secured to the adjacent end of a rear driving shaft 39. The rear end of the driving shaft 38 is connected to a stub shaft 40, by means of a universal joint 41, and the front end of the rear driving shaft is connected to a similar stub shaft 42 by means of a similar joint 43. The stub shafts 41 and 42 are journaled in bearings in the side walls of upper and lower casings 44 and 45 respectively.

The casing 44 is arranged directly above the casing 45, and an operating shaft 46 is journaled in vertical position in the two casings. Each end of the said shaft is reduced and screw-threaded for engagement by a nut, the nut 47 being threaded onto the upper end of the shaft, and the nut 48 on the lower end. A ball bearing 49 is arranged between the lower end of the casing 45 and a washer 50 adjacent to the nut 48, and a washer 51 is arranged below the nut 47. A second ball bearing 52 is arranged at the lower end of the upper casing, and each casing is provided with a removable head 53 and 54 respectively, the said heads being secured in place by means of bolts 55. A bevel gear 56 is secured to the shaft 46 in the casing 45, and the said bevel gear meshes with a pinion 57 on the inner end of the stub shaft 42.

A sleeve 58 is secured to the shaft 46 in the casing 44, and the said sleeve carries two series of bevel gear teeth, forming bevel gears 59 and 60. The bevel gear 60 is engaged by a pinion 61 on the stub shaft 40, and the bevel gear 59 is engaged by a pinion 62 on the engine shaft 63, the rear end of the said engine shaft being journaled in a bearing 64 in the front wall of the upper casing 44. The sleeve 58 which carries the bevel gears 59 and 60 is internally enlarged, and the lower end of the upper casing 44 is provided with a tubular extension 65 which extends upwardly into the enlargement, and a ball bearing 66 is arranged between the lower end of the sleeve 58 and the bottom of the said upper casing.

The casing 44 is arranged within the supporting frame 67, shown in Fig. 7, the said frame being of tubular material, as shown in Figs. 2 and 6, and having upper and lower bearings 68 and 69 respectively for the operating shaft 46. It will be noted that the bearing 68 is much smaller than the bearing 69, for the reason that the ball bearing 52 is arranged between the lower end of the shaft and the bearing 59. The upper casing is held within the frame 67, and the lower casing is supported by the lower end of the shaft. The bolt 47 and the washer 51 rest upon the upper face of the bearing 68, to prevent downward movement of the shaft.

The frame 67 has a rearward extension 70, and the under face of the said extension is channeled, as shown in Fig. 2, to receive bearing rollers 71, and the said rollers roll upon an arc-shaped cross bar 72 arranged below the frame proper, and connected to the bars 1 at its end by means of brackets 73, the said brackets being secured to the bars 1, as shown. Arms 74 extend forwardly from the frame 67 and then upwardly, to an integral connection with the front bolster 21, and the motor 75 is supported by the said arms and between the same.

At the rear end of the motor a cross bar 76 connects the arms, and at the front end of the motor a steering bar 77 is arranged, the said bar being secured to the arms 74 and extending beyond the said arms beyond the frame members 1. The ends of the steering bar are connected to the rear ends of the springs 24, the said springs being connected to the ends of the front bolster 21. The frame 67 and the arms 74 are swung laterally to steer the vehicle, and the said frame is moved laterally by means of a steering shaft 78. The said shaft is journaled in a bearing 79 on one of the bars 1, and is provided at its upper end with a steering wheel 80. The shaft is also supported by a bearing 81 below the bar 1, the bearing having bracket arms 82 extending above and secured to the adjacent bar 1.

A flexible member 83 in the form of a rope or cable has its ends connected to eyes 84 at the front corners of the frame 67. From one of the eyes, the flexible member passes to a reel 78ª on the shaft 78 and winds upon the same. From the other eye the flexible member passes over a pulley 85 journaled on the lower end of a depending bracket 86, and thence across the body to the reel.

It will be evident that when the shaft is oscillated in either direction, the frame 67 will be moved toward one side or the other of the frame, the direction depending upon the direction of rotation of the shaft. The swinging of the frame will swing the front truck comprising the front axle and the front bolster, to change the direction of motion of the vehicle. The rear driving shaft 39 is supported near its connection with the stub shaft 42 by means of a sleeve 87, and a bushing 88 is arranged between the sleeve and the shaft. The sleeve is supported by braces 89, the said braces being connected to the rear bolster 25.

In operation, when the motor is running, the engine shaft 63 will be rotated, and will in turn rotate the operating shaft, through the connection of the pinion 62 with the bevel gear 59. The bevel gear 60 will rotate the pinion 61, and through the front driving shaft the front axle 3 will be rotated. The operating shaft 46 will also be rotated, and will rotate the rear driving shaft 39, through the bevel gear 56, the pinion 57, and the stub shaft 42. When it is desired to change the direction of motion of the truck, the steering wheel 80 is oscillated in the proper direction, to swing the transmission mechanism and its supporting frame to one side or the other, the said frame being supported by the bar 72 at its rear end, and by the arms 74 at its front end.

The rear truck has a limited angular movement with respect to the main frame of the truck, as shown in Fig. 1ª, and the universal joints 41 and 43 permit the transmission to be changed with respect to the driving shafts, without interfering with the driving of the front and the rear axles. Each wheel is driven, and by reason of the four wheel drive, a large amount of strain is taken off of the rear wheels, the said strain being distributed to all of the wheels. The casings 44 and 45 are filled with oil, as shown in Fig. 6, so that the transmission mechanism moves in a path of oil at all times.

I claim:

1. An automobile drive, comprising a substantially rectangular supporting frame, front and rear axles arranged below the frame, a bolster at each axle below the frame, each bolster carrying the lower section of a fifth wheel, the upper section of the front fifth wheel being rigid with the frame, a housing for each axle, a support for the upper section of the rear fifth wheel, a sliding connection between the frame and each end of the support, springs connecting each bolster with the housing of the adjacent axle, an auxiliary frame extending rearwardly from the front bolster, an arc-shaped guide bar arranged transversely of the frame at the rear end of the auxiliary frame, said frame having an extension moving on the guide bar, means for swinging the auxiliary frame, a motor supported by the auxiliary frame near the front axle, transmission mechanism supported by the auxiliary frame at its rear end and connected to the motor, a drive shaft extending from the transmission toward each axle, each drive shaft having a driving connection with the adjacent axle, the swinging means for the auxiliary frame comprising a vertical shaft journaled at one side of the frame, a steering wheel secured to the shaft, a reel secured to the lower end of the shaft, a pulley journaled on the frame at the opposite side from the steering shaft, a flexible member having its ends connected to the opposite sides of the auxiliary frame, said member passing from its connection at the side adjacent to the shaft to the reel and winding on the reel and passing thence transversely of the frame and over the pulley to its connection with the opposite side of the auxiliary frame.

2. An automobile drive, comprising a substantially rectangular supporting frame, axles arranged below the frame, the front axle being at the front of the frame and the rear axle being near the rear of the frame, a bolster at each axle below the frame, each bolster carrying the lower section of a fifth wheel, the upper section of the front fifth wheel being rigid with the frame, a housing for each axle, a support for the upper section of the rear fifth wheel, a sliding connection between the frame and each end of the support, springs connecting each bolster with the housing of the adjacent axle, an auxiliary frame extending rearwardly from the front bolster, an arc-shaped guide bar arranged transversely of the frame at the rear end of the auxiliary frame, said frame having an extension moving on the guide bar, means for swinging the auxiliary frame, a motor supported by the auxiliary frame near the front axle, transmission mechanism supported by the auxiliary frame at its rear end and connected to the motor, and a drive shaft extending from the transmission toward each axle, each drive shaft having a driving connection with the adjacent axle.

3. An automobile drive, comprising a substantially rectangular frame, a front and rear axle below the frame, a housing for each axle, a bolster for each axle arranged above the axle, springs connecting each bolster to the adjacent axle housing, a pivotal connection between the front bolster and the frame, a support arranged transversely of the frame between the rear bolster and frame and movable with respect to the frame, a pivotal connection between the bolster and the support, an auxiliary frame extending rearwardly from the front bolster, said auxiliary frame being adapted to carry a motor, transmission mechanism carried by the auxiliary frame and connected to the motor, a driving connection between the transmission mechanism and each axle, means on the frame for swinging the auxiliary frame, a guide bar arranged transversely of the frame below the same at the rear end of the auxiliary frame, said frame having an extension moving on the guide bar.

4. An automobile drive, comprising a substantially rectangular frame, a front and rear axle below the frame, a housing for each axle, a bolster for each axle arranged above the axle, springs connecting each bolster to the adjacent axle housing, a pivotal connection between the front bolster and the frame, a support arranged transversely of the frame between the rear bolster frame and movable with respect to the frame, a pivotal connection between the bolster and the support, an auxiliary frame extending rearwardly from the front bolster, said auxiliary frame being adapted to carry a motor, transmission mechanism carried by the auxiliary frame and connected to the motor, a driving connection between the transmission mechanism and each axle, and means on the frame for swinging the auxiliary frame.

5. An automobile drive, comprising a substantially rectangular frame, front and rear axles for the frame, a bolster for each axle and connected thereto, a pivotal connection between the front bolster and the frame, a support arranged transversely of the rear end of the frame and slidably connected to the frame, a pivotal connection between the rear bolster and the support, an auxiliary frame extending rearwardly from the front bolster and adapted to support a motor, transmission mechanism carried by the auxiliary frame, and adapted for connection with the motor, a driving connection between the transmission mechanism and each axle, and means on the frame for swinging the auxiliary frame.

6. An automobile drive, comprising a substantially rectangular frame, front and rear axles for the frame, a bolster for each axle and connected thereto, a pivotal connection between the front bolster and the frame, a support arranged transversely of the rear end of the frame and slidably connected to the frame, a pivotal connection between the rear bolster and the support, an auxiliary frame extending rearwardly from the front bolster and adapted to support a motor, and means on the frame for swinging the auxiliary frame.

ALONZO OLLIF TURNER.

Witnesses:
C. E. CULBREATH,
CHAS. BARTLETT.